(12) United States Patent
Goodwin et al.

(10) Patent No.: US 7,025,309 B2
(45) Date of Patent: Apr. 11, 2006

(54) LINE HANGER

(75) Inventors: Kevin Goodwin, Frankfort, IL (US); Albert R. Cox, Orland Park, IL (US); Timothy Crawford, Country Club Hills, IL (US)

(73) Assignee: Andrew Corporation, Orland Park, IL (US)

( * ) Notice: Subject to any disclaimer, the term of this patent is extended or adjusted under 35 U.S.C. 154(b) by 0 days.

(21) Appl. No.: 10/287,667

(22) Filed: Nov. 4, 2002

(65) Prior Publication Data

US 2004/0084574 A1    May 6, 2004

(51) Int. Cl.
*F16L 3/00* (2006.01)
(52) U.S. Cl. ............ 248/74.4; 248/74.1; 248/74.2; 248/62; 248/68.1
(58) Field of Classification Search ........... 248/74.1, 248/74.2, 74.4, 62, 68.1, 63, 303, 316.7, 248/302, 305
See application file for complete search history.

(56) References Cited

U.S. PATENT DOCUMENTS

| 333,119 | A |   | 12/1885 | Ephraim |
| 619,915 | A |   | 2/1899 | Wentworth |
| 1,311,628 | A | * | 7/1919 | Walsh |
| 1,373,716 | A | * | 4/1921 | Dottl |
| 1,720,746 | A |   | 7/1929 | Povlsen et al. |
| 1,963,908 | A | * | 6/1934 | Manasek .......... 248/31 |
| 2,014,971 | A |   | 9/1935 | Knutson |
| 2,273,571 | A | * | 2/1942 | Hafemeister ........ 248/62 |
| 2,375,513 | A | * | 5/1945 | Bach .................. 248/59 |
| 2,547,813 | A |   | 4/1951 | Coons et al. ........ 248/74 |
| 2,577,120 | A |   | 12/1951 | Franz .................. 211/71 |
| 2,767,946 | A |   | 10/1956 | Weeks ................ 248/50 |
| 2,846,174 | A |   | 8/1958 | Sewell ............... 248/223 |
| 2,893,698 | A |   | 7/1959 | Nunninghoff ......... 257/1 |
| 2,972,460 | A |   | 2/1961 | Kenyon .............. 248/62 |
| 3,185,418 | A | * | 5/1965 | Appleton ............ 248/72 |
| 3,275,274 | A |   | 9/1966 | Hutcheon ........... 248/309 |
| 3,295,807 | A |   | 1/1967 | Von Volkli ......... 248/74 |
| 3,310,264 | A | * | 3/1967 | Appleton ............ 248/72 |
| 3,385,545 | A | * | 5/1968 | Patton ............... 248/68 |
| 3,547,385 | A | * | 12/1970 | Kindorf ............. 248/62 |
| 3,739,435 | A | * | 6/1973 | Baker ............... 24/257 R |
| 4,119,285 | A | * | 10/1978 | Bisping et al. ....... 248/72 |

(Continued)

FOREIGN PATENT DOCUMENTS

CA    1 172 231    8/1984

OTHER PUBLICATIONS

Erico International, CADDY Conduit Product Catalog (pp. 10-13, 58-73, 82-83, 128-133)(Undated).

Primary Examiner—Robert P. Olszewski
Assistant Examiner—Steven Marsh
(74) Attorney, Agent, or Firm—Wood, Herron & Evans, L.L.P.

(57) ABSTRACT

A line hanger for securing lines, such as transmission, pneumatic, hydraulic, electrical and other types of lines, to a support structure and a method of mounting and supporting one or more lines from a support structure. The line hanger includes an attachment support provision configured for mounting to the support structure and a pair of spaced-apart clamping arms depending outwardly from the attachment provision. The clamping arms are configured to resiliently separate for slidingly receiving an line and to resiliently relax for applying a clamping force to secure the line. Multiple line hangers may be interlinked or stacked relative to the support structure for support multiple lines.

12 Claims, 6 Drawing Sheets

U.S. PATENT DOCUMENTS

| | | | |
|---|---|---|---|
| 4,286,654 A | 9/1981 | Ruhe et al. | 165/172 |
| 4,306,697 A | 12/1981 | Mathews | 248/68 |
| 4,325,526 A | 4/1982 | Kitagawa | 248/73 |
| 4,479,625 A | 10/1984 | Martz | |
| 4,493,468 A | 1/1985 | Roach | 248/62 |
| 4,654,612 A | 3/1987 | Smith | 333/248 |
| 4,750,651 A * | 6/1988 | Jan | 223/89 |
| 4,763,132 A | 8/1988 | Juds et al. | 343/890 |
| 4,790,060 A | 12/1988 | Council et al. | 29/525.1 |
| 4,909,467 A * | 3/1990 | Shan-Pao | 248/312 |
| 4,958,792 A | 9/1990 | Rinderer | 248/74.2 |
| 5,108,055 A | 4/1992 | Kreinberg et al. | 248/71 |
| 5,188,609 A * | 2/1993 | Bayless et al. | 604/180 |
| 5,393,021 A | 2/1995 | Nelson | 248/71 |
| 5,443,232 A * | 8/1995 | Kesinger et al. | 248/62 |
| 5,533,696 A | 7/1996 | Laughlin et al. | 248/74.2 |
| 5,971,329 A * | 10/1999 | Hickey | 248/68.1 |
| D417,353 S * | 12/1999 | Laga | D6/566 |
| 6,161,804 A | 12/2000 | Paske et al. | 248/74.1 |
| 6,172,654 B1 | 1/2001 | Martek | 343/893 |
| 6,244,545 B1 | 6/2001 | McCrary | 248/73 |
| 6,354,543 B1 | 3/2002 | Paske | 248/68.1 |
| 2002/0005463 A1* | 1/2002 | Paske et al. | 248/74.1 |

* cited by examiner

LINE HANGER

FIELD OF THE INVENTION

This invention relates generally to devices for hanging lines and, in particular, to hangers for securing transmission, pneumatic, hydraulic, electrical, and other lines to support structures.

BACKGROUND OF THE INVENTION

Line hangers are commonly used to secure lines, such as cables and transmission lines, to the framework of support structures, such as antenna towers. Lines are routed upward from the base of the antenna tower to communicate with telecommunications devices positioned above the base either at the tower apex or at an intermediate location. Generally, each line is attached to the antenna tower by a large number of line hangers mounted at periodically-spaced locations along its height. Antenna towers may reach several hundred feet in height with line hangers mounted at about three feet intervals. After the line hangers have been installed, the line is strung and engaged with the line hangers. Certain line hangers are constructed to be stackable such that multiple line hangers can be interlocked to extend outwardly from the antenna tower. Stacked line hangers significantly increase the number of lines that can be routed up the antenna tower by making efficient use of the available attachment points.

Conventional line hangers suffer from significant deficiencies and shortcomings. In particular, most line hangers are complex structures that are costly to manufacture due to the costs of raw materials, manufacturing equipment and labor. In addition, conventional line hangers require a large amount of auxiliary hardware, such as screws, bolts, nuts and washers. Stacked line hangers may require at least partial disassembly of existing line hangers to add another line. As a result, running lines along the height of antenna towers is time-consuming, labor-intensive and expensive.

Therefore, it would be desirable to have a line hanger characterized by a simple, inexpensive construction.

DETAILED DESCRIPTION OF THE INVENTION

Although the invention will be described in connection with certain embodiments, it will be understood that the invention is not limited to those embodiments. On the contrary, the description of the invention is intended to cover all alternatives, modifications, and equivalent arrangements as may be included within the spirit and scope of the invention as defined by the appended claims.

Figure 1:
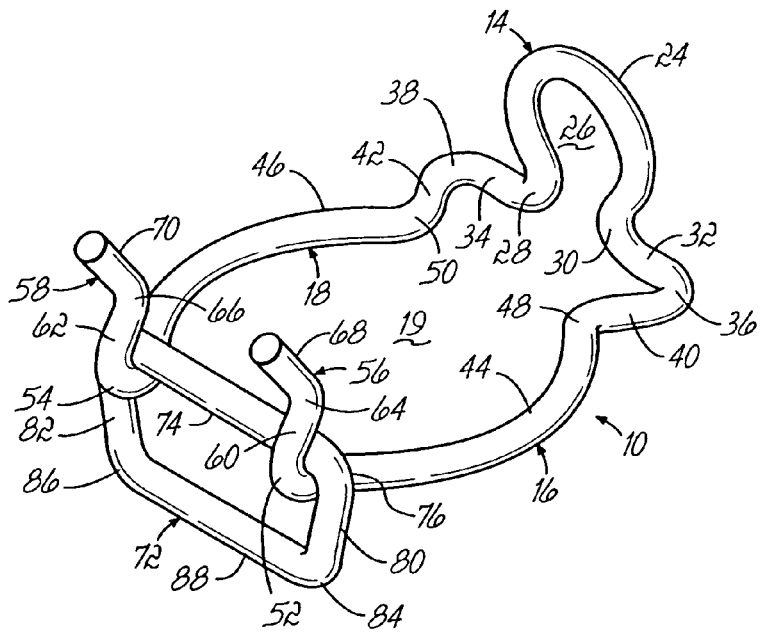
FIG. 1 is a perspective view of a line hanger in accordance with the principles of the invention.

With reference to FIG. 1, a mounting device or line hanger 10 according to the principles of the invention is a multi-bend, three-dimensional structure formed from a continuous length of wire or rod. The rod has a diameter suitable for providing adequate rigidity to function as a load-bearing structure as well as sufficient resiliency. The rod forming the line hanger 10 is generally circular in radial cross-section. Line hanger 10 may be formed from any suitable material including, but not limited to, metals such as stainless steels and galvanized steels. For light duty applications, the line hanger 10 may be molded from a polymer resin. The line hanger 10 may be a one-piece monolithic structure that is unitary or may be formed from multiple components joined together by, for example, welded or fused junctions.

With reference to FIG. 1, the line hanger 10 includes a support attachment provision or section, generally indicated by reference numeral 14 and a pair of clamping arms 16, 18 of comparable length that define an area or space 19 for receiving and securing a line 20, typically cylindrical, selected from among various different types, such as a transmission line, a pipe, a conduit or the like. The attachment section 14 of the line hanger 10 is configured to be attached with a conventional fastener 22 to a support structure 21, such as a portion of an antenna tower. Alternatively, the clamping arms 16, 18 of one line hanger 10 may be coupled with the attachment section 14 of another line hanger 10 for stacking multiple cable hangers 10. The line hanger 10 may be attached to support structure 21 vertically, horizontally or at angle to an axis of the support structure 21 using any conventional bracket 23.

Multiple line hangers 10, each identical to line hanger 10, are attached to the support structure 21 with a spacing between adjacent line hangers 10 adequate to resist forces due to wind and weather. Then, the line 20 is strung up the support structure 21 and a length of the line 20 is secured to each of the multiple line hangers 10. The rigidity of each individual line hanger 10 must be adequate to support its distributed portion of the total load from the attached line 20 including external forces, such as wind, acting on the line 20 and any additional load from stacked line hangers 10 and their respective lines 20, as will be described below. The resiliency of the line hanger 10 must be sufficient to allow the line hanger 10 to be coupled with the line 20, as described below.

The attachment section 14 of line hanger 10 defines a closed end that includes a generally round or generally circular loop 24 having a central passage 26 with a diameter greater than or equal to a diameter of a threaded shank of the fastener 22 and less than an outer diameter of a head of the fastener 22. The loop 24 extends over an arc length of less than 360° terminated by a transversely-spaced pair of oppositely-directed angled bends 28, 30 that define a gap in loop 24 dimensioned to prevent vertical passage of the threaded shank of the fastener 22. It is contemplated by the invention that the loop 24 may possess any arcuate or polygonal shape suitable to cooperate with the fastener 22 for securing the line hanger 10 with the support structure 21. Extending outwardly from each of the angled bends 28, 30 is a corresponding one of a pair of substantially-linear widening legs or segments 32, 34 of comparable length. Widening segment 32 extends outwardly from loop 24 in an opposite direction from widening segment 34. The loop 24 and extension segments 32, 34 lie substantially in a common vertical plane, the angled bends 28, 30 are obtuse angles, and the extension segments 32, 34 are substantially collinear.

With continued reference to FIG. 1, each of the extension segments 32, 34 is coupled by a respective one of shoulders or angled bends 36, 38 with a corresponding one of a pair of short bridging legs or segments 40, 42 of comparable length. The bridging segments 40, 42 depend away from the extension segments 32, 34 in a horizontal plane generally orthogonal to the vertical plane containing the loop 24 and the extension segments 32, 34. The bridging segments 40, 42 operate to separate the loop 24 horizontally from the clamping arms 16, 18 to provide an empty space for receiving the head of the fastener 22. As a result, the head of the fastener 22 does not interfere with the securement of the line 20 with the line hanger 10. The separation also facilitates stacking of multiple line hangers 10, as described below.

Generally, the clamping arms 16, 18 depend outwardly from the attachment section 14 with a transverse relationship to the attachment section 14. Each of the clamping arms 16, 18 has a respective arcuate leg or segment 44, 46 joined by a corresponding one of a pair of angled bends 48, 50 with a respective one of the bridging segments 40, 42. The arcuate segments 44, 46 and the bridging segments 40, 42 generally lie in a common horizontal plane. The arcuate segments 44, 46 are curved into a concave-convex shape with inwardly confronting sides being concave so as to share a common radius of curvature relative to the center of the space 19 between the clamping arms 16, 18. The radius of curvature corresponds generally to the radius of the line 20. Each of the arcuate segments 44, 46 is joined by a respective one of the pair of angled bends 52, 54 with a corresponding one of a pair of hooks or upright members 56, 58 that depend upwardly from the horizontal plane containing the arcuate segments 44, 46.

Each of the upright members 56, 58 includes a respective one of a pair of relatively short legs or segments 60, 62 of comparable length that depend inwardly toward the loop 24 joined by a respective one of a pair of angled bends 64, 66 with a corresponding one of a pair of relatively long legs or segments 68, 70. Segments 68, 70 are each inclined outwardly and away from the corresponding one of arcuate segments 44, 46. The spacing between the upright members 56, 58 and the spacing between the angled bends 52, 54 is similar to the spacing between the confronting concave sides of angled bends 36, 38 of the attachment section 14. As a result, the attachment section 14 effectively operates as a terminating element for interconnecting the clamping arms 16, 18 to prevent relative separation when line 20 is secured therebetween.

The clamping arms 16, 18 are resiliently separable or spreadable between a relaxed condition in which no line 20 is present, a spread condition that permits insertion of the line 20 into the widened throat or gap between upright members 56, 58, and a clamping condition intermediate between the relaxed and spread conditions in which the clamping arms 16, 18 collectively apply an inwardly-directed clamping force for securing line 20 with the line hanger 10. To couple the line 20 with the line hanger 10, the line 20 is positioned proximate the gap between the upright members 56, 58 and moved inwardly in a direction generally toward the loop 24. Sliding contact between the exterior of the line 20 and the upright members 56, 58 causes the clamping arms 16, 18 to resiliently deflect outwardly or separate from the relaxed condition to the spread condition so that the line 20 can pass between the upright members 56, 58. As the line 20 is moved into the space 19, the clamping arms 16, 18 relax inwardly to the clamping condition in which the clamping arms 16, 18 apply an inward clamping force to the line 20. The clamping force applied by the clamping arms 16, 18 grips line 20 with a clamping force sufficient to prevent significant axial movement of the line 20 relative to line hanger 10.

With continued reference to FIG. 1, a terminating link or element 72, formed from a trapezoidal loop of wire or rod, is provided that is capable of being removably coupled with the line hanger 10. To that end, the inner periphery of the terminating element 72 is dimensioned to fit over the upright members 56, 58 so that the terminating element 72 can be installed on the clamping arms 16, 18 after a line 20 is positioned in space 19. The terminating element 72 includes a long segment 74 joined at opposite ends by one of a pair of angled bends 76, 78 (FIG. 3) with a corresponding one of two relatively short segments 80, 82. A respective one of two angled bends 84, 86 joins a respective one of the short segments 80, 82 with another relatively long segment 88 that is aligned generally parallel with long segment 74. When the terminating element 72 is engaged with the line hanger 10, the angled bends 76, 78 engage the angled bends 52, 54 of the line hanger 10. The terminating element 72 constrains the clamping arms 16, 18 against relative deflection so that the line 20 cannot be disengaged from the line hanger 10 by movement outwardly through the gap between the upright members 56, 58 and also operates to maintain the clamping force of the clamping arms 16, 18 securing the line 20 against significant axial movement relative to line hanger 10.

The line hanger 10 of the invention may be readily scaled to accept and secure lines 20 of differing sizes. In particular, the dimensions of the line hanger 10 of the invention may be scaled to accept lines 20 of various different diameters or to accept lines 20 having a range of diameters. In addition, the clamping arms 16, 18 can accept lines 20 within a range of dimensions. Generally, the separation of the clamping arms 16, 18 in the relaxed condition determines the minimum diameter of line 20 that may be secured in the clamping position. The clamping arms 16, 18 are spreadable to supporting lines 20 up to a maximum dimension determined by the resiliency and ability to separate the clamping arms 16, 18. In addition, the diameter of the wire or rod forming line hanger 10 is selected and the dimensions are adjusted such that transitions among the relaxed, spread and clamping conditions does not result in significant permanent deformation of the material forming the clamping arms 16, 18.

Figure 2:
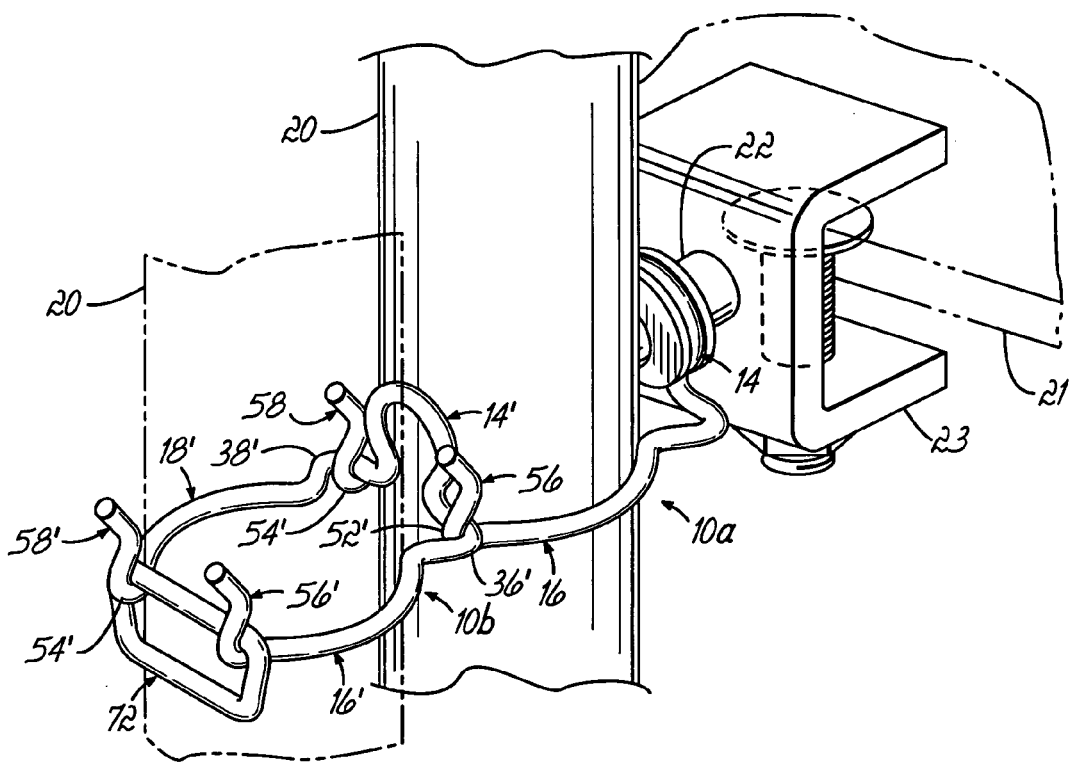
FIG. 2 is a front perspective view of a pair of line hangers of FIG. 1 stacked according to the principles of the invention.
Figure 3:
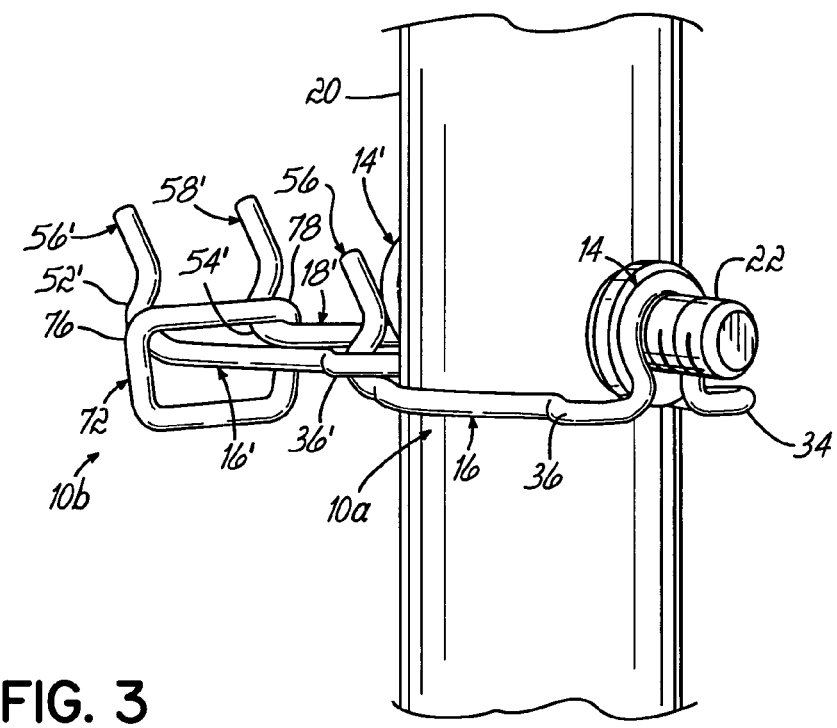
FIG. 3 is a rear perspective view similar to FIG. 2.

With reference to FIGS. 2 and 3, the line hanger 10 of the invention is stackable in that a second line hanger 10b can be mounted to a first line hanger 10a, which is itself attached to the support structure 21. Each of the line hangers 10a and 10b are identical line hanger 10. In the following description, reference numerals representing features of the second line hanger 10b will be distinguished by prime notation from reference numerals representing identical features of the first line hanger 10a. The distance between the confronting concave portion of angled bends 36', 38' of the second line hanger 10b in the clamping condition is greater than the distance separating the upright members 56, 58 of the first line hanger 10a. The extension segments 32', 34' of the second line hanger 10b contact and are supported by a corresponding one of clamping arms 16, 18 adjacent to the respective one of angled bends 52, 54. The second line hanger 10b is secured against cantilevering by the contact between loop 24 and the line 20 held by the first line hanger 10a. The interconnection between the angled bends 36', 38' of line hanger 10b and the angled bends 52, 54 of the upright members 56, 58 of line hanger 10a prevents inadvertent spreading of the clamping arms 16, 18.

In use, a set of line hangers 10a are fastened with fasteners 22 to the support structure 21 at successive spaced attachment points between the base of the support structure 21 and the destination of the line 20. The line 20 is strung upwardly proximate to the line hangers 10a and the line 20 is pressed inwardly between the upright members 56, 58 of each line hanger 10a which provides a temporary spreading force that separates the respective clamping arms 16, 18 from their initial relaxed condition to the spread condition. As the line 20 moves into the space 19 between the respective clamping arms 16, 18, the clamping arms 16, 18 relax inwardly to create the clamping condition for securing the line 20 against movement. The clamping arms 16, 18 of each line hanger 10a are safeguarded against spreading by the placement of a corresponding terminating element 72. Alternatively, one or more additional sets of line hangers 10b may be stacked to the first set of line hangers 10a for directing one or more additional lines 20 along the support structure 21 and the mounting sequence is repeated for each additional line 20. The last stacked set of line hangers 10b is terminated, after the corresponding line 20 is inserted, with a corresponding plurality of terminating elements 72.

Figure 4:
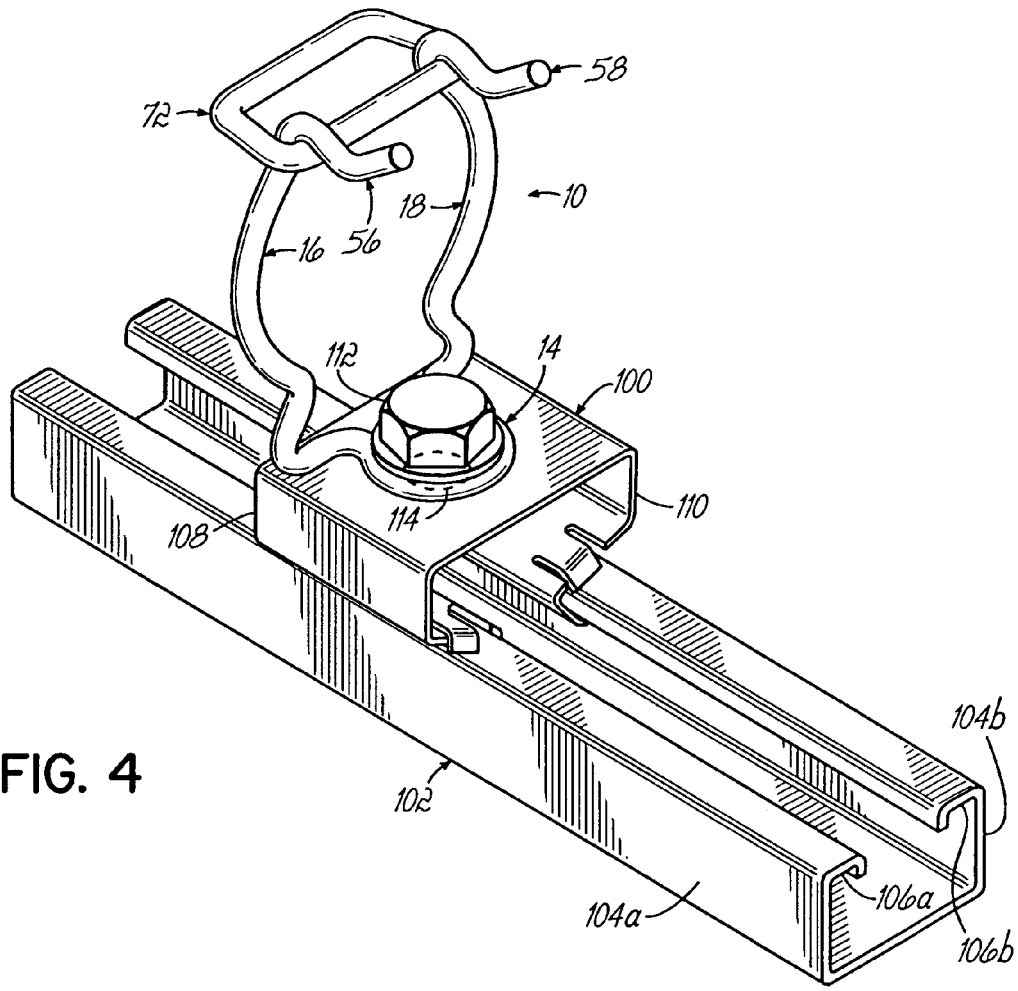
FIG. 4 is a perspective view of the line hanger of FIG. 1 mounted to an exemplary anchor rail using an adapter.

With reference to FIG. 4 in which like reference numerals refer to like features in FIGS. 1–3, an adapter 100 may be utilized for securing the line hanger 10 of the invention with an anchor rail 102 or other anchor accessory, such as UNISTRUT® brand framing members, bracket and fittings. The anchor rail 102 is formed as a U-shaped channel having a pair of upstanding, opposing legs 104a, 104b in which each of the legs 104a, 104b terminates in a respective downwardly-oriented lip 106a, 106b. The adapter 100 includes a pair of flexible mounting legs 108, 110 each configured for engaging a corresponding one of lips 106a, 106b. Adapters 100 suitable for use in the invention are disclosed in International Application Number PCT/US02/23781, which is hereby incorporated by reference herein in its entirety. The attachment section 14 of line hanger 10 is secured with a suitable fastener 112 to a threaded opening 114 in the adapter 100. Additional line hangers (not shown) may be coupled with line hanger 10, as illustrated in FIG. 2, to create a stacked or chained arrangement.

Figure 5:
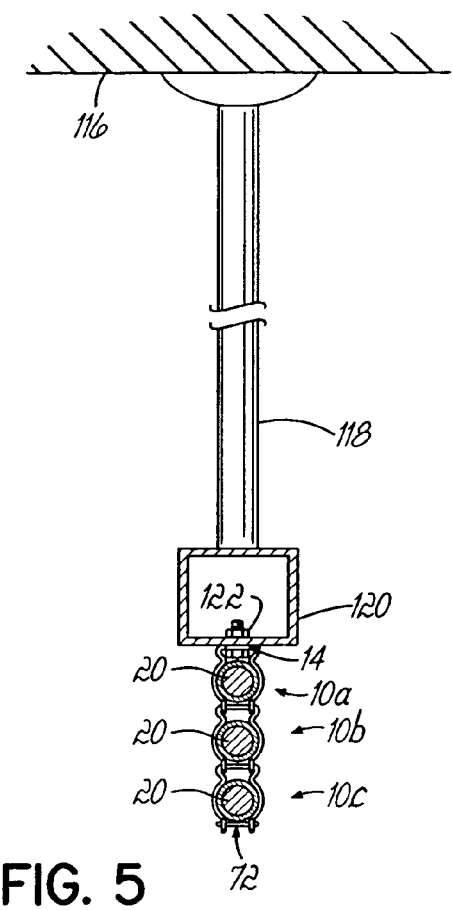
FIG. 5 is a side view of a stacked plurality of the line hangers of FIG. 1 suspended from a ceiling.

With reference to FIG. 5 in which like reference numerals refer to like features in FIGS. 1–3, a plurality of, for example, three line hangers 10a, 10b, 10c, each identical to line hanger 10, may be supported or hung vertically from a ceiling or other support surface 116 by, for example, a rod 118 in a stacked or chained arrangement. In such a stacked or chained arrangement, a coupling element 120 may be used to couple a first line hanger 10a to rod 118 using a fastener 122. Line hanger 10b is stacked or hung from the first line hanger 10a and line hanger 10c is stacked or hung from line hanger 10b to form the stacked arrangement. Terminating element 72 is used to terminate the last line hanger 10c in the stack. Each of the line hangers 10a, 10b, 10c supports and secures a corresponding one of multiple lines 20. The invention contemplates that the first line hanger 10a may be hung directly from the rod 118 without the intervening coupling element 120. To that end, the attachment section 14 of the first line hanger 10a may receive a threaded end of rod 118, with a mating element (not shown) provided to secured the first line hanger 10a with the rod 118. It is contemplated by the invention that two or more line hangers 10 may form the stacked arrangement.

Figure 6:
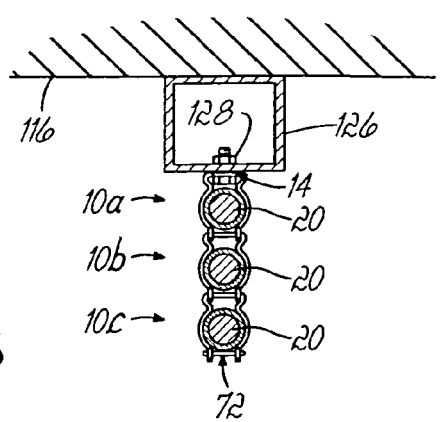
FIG. 6 is a side view similar to FIG. 5 in which a different ceiling mount is illustrated.

With reference to FIG. 6 in which like reference numerals refer to like features in FIG. 5, the plurality of line hangers 10a, 10b, 10c may be suspended in a stacked arrangement from the support surface 116 with the cooperation of an intervening coupling element 126. A first line hanger 10a is secured with, for example, a fastener 128 to the coupling element 126, which is itself secured in a conventional manner to the support surface 116. Additional hangers 10b and 10c are stacked from the first line hanger 10a to provide the stacked arrangement. Terminating element 72 is used to terminate the last line hanger 10c in the stack. Each of the line hangers 10a, 10b, 10c supports and secures a corresponding one of multiple lines 20.

Figure 7:
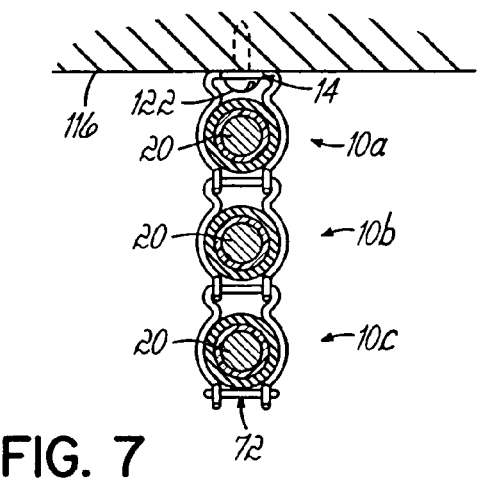
FIG. 7 is a side view of a stacked plurality of line hangers of FIG. 1 suspended from a mount supported by an overhead conduit.

With reference to FIG. 7 in which like reference numerals refer to like features in FIGS. 5 and 6, the plurality of line hangers 10a, 10b, 10c may be supported or hung vertically from the support surface 116 by direct attachment in a stacked arrangement. In this stacked arrangement, a fastener 130 is used to directly couple the attachment section 14 of a first line hanger 10a to the support surface 116. Line hanger 10b is stacked or hung from the first line hanger 10a and line hanger 10c is stacked from line hanger 10b, as appropriate, to form the stacked arrangement. Terminating element 72 is used to terminate the last line hanger 10c in the stack. Each of the line hangers 10a, 10b, 10c supports and secures a corresponding one of multiple lines 20.

Figure 8:
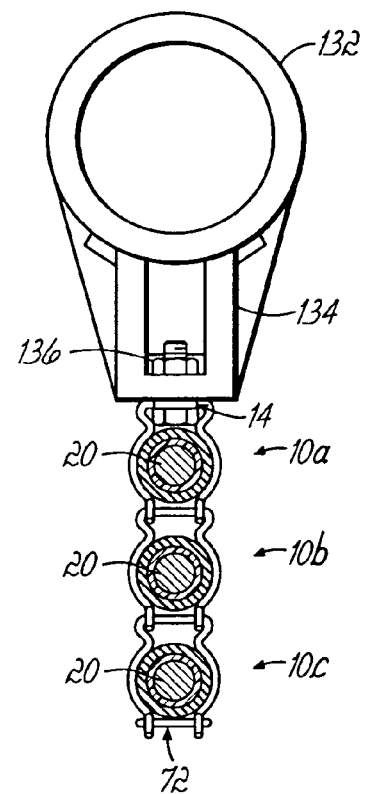
FIG. 8 is a side view of a stacked plurality of line hangers of FIG. 1 in which the first line hanger in the stack is directly mounted to a support surface.

With reference to FIG. 8 in which like reference numerals refer to like features in FIGS. 5–7, the plurality of line hangers 10a, 10b, 10c may be suspended from a cylindrical overhead conduit 132, such as a pipe or a line, using a coupling element 134 configured to engage the conduit 132. A first line hanger 10a is secured with, for example, a fastener 136 to the coupling element 134. The coupling element 134 is itself secured in a conventional manner to the overhead conduit 132. Additional hangers 10b and 10c are stacked from the first line hanger 10a to create a stacked arrangement. Terminating element 72 is used to terminate the last line hanger 10c in the stack. Each of the line hangers 10a, 10b, 10c supports and secures a corresponding one of multiple lines 20.

Figure 9:
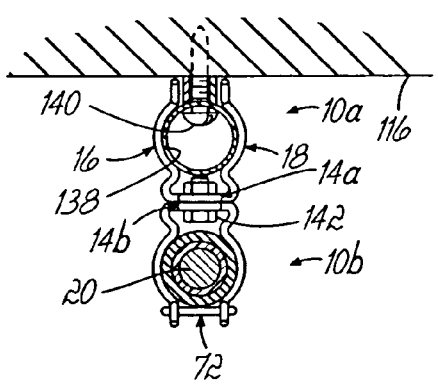
FIG. 9 is a side view similar to FIG. 8 in which the first line hanger is mounted to a conduit fastened to the support surface.

With regard to FIG. 9 in which like reference numerals refer to like features in FIGS. 5–8, a first line hanger 10a may be suspended from an overhead conduit 138, such as a pipe or a line. The first line hanger 10a is secured by its clamping arms 16, 18 about the cylindrical outer surface of the overhead conduit 138, which is itself secured in a conventional manner, such as the illustrated fastener 140, to the support surface 116. An attachment section 14b of the second line hanger 10b is secured with an attachment section 14a of the first line hanger 10a using a fastener 142 to provide an initial stacked pair. Additional line hangers (not shown) may be stacked from the second line hanger 10b as described herein. Terminating element 72 is used to terminate the last line hanger 10b in the stack. Each of the line hangers 10a, 10b, 10c supports and secures a corresponding one of multiple lines 20.

Figure 10:
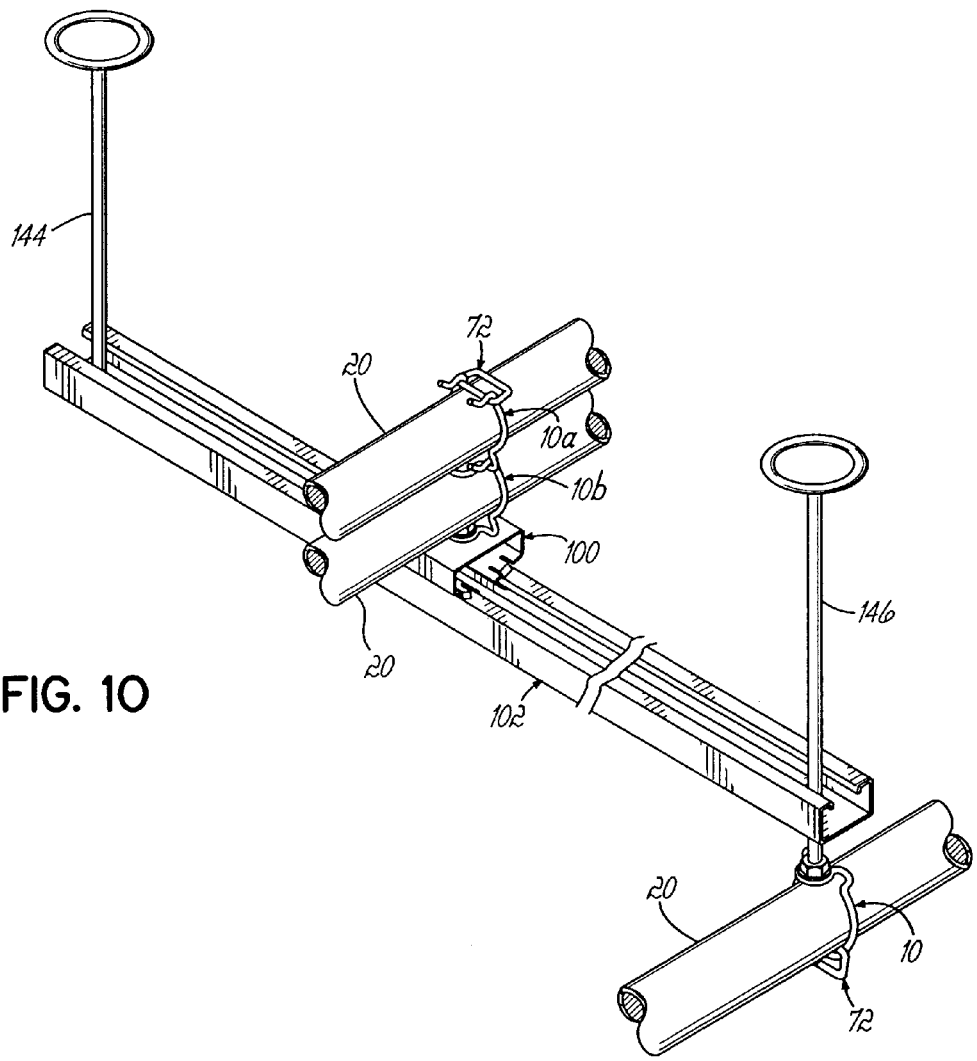
FIG. 10 is a perspective view of line hangers according to FIG. 1 attached to an anchor rail used as a trapeze support and showing still another configuration in which an adapter is present.

With regard to FIG. 10 in which like reference numerals refer to like features in FIGS. 5–9, line hanger 10 may be coupled with a trapeze support, such as formed by anchor rail 102 supported at opposite ends by, for example, a pair of threaded rods 144, 146 secured to and suspended from a support surface 116 (FIG. 9). This type of trapeze support is commonly used for supporting lines 20, such as conduit, piping and the like. It is apparent, as described herein, that the line hanger 10 may be used in conjunction with anchor rail 102 for supporting multiple lines 20 either singularly or in stacked arrangements, or using suitable adapters, such as adapter 100 described herein.

Figure 11:
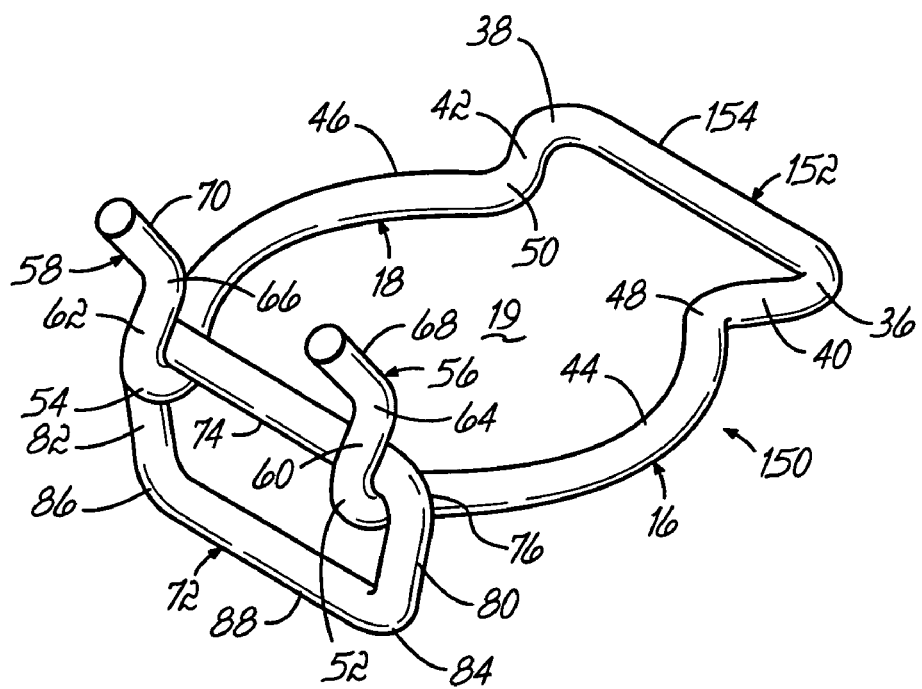
FIG. 11 is a perspective view of an alternative embodiment of a line hanger in accordance with the principles of the invention.

With reference to FIG. 11 in which like reference numerals refer to like features in FIGS. 1–3, a line hanger 150 is provided that is substantially identical to line hanger 10 other than modifications made to attachment section 14. Specifically, line hanger 150 is provided with an attachment section 152 in which angled bends 36, 38 are connected by a linear segment 154. Line hanger 150 may be stacked, as described above, with other line hangers 10 by engaging the angled bends 36, 38 of line hanger 150 and the angled bends 52, 54 of the upright members 56, 58 of another line hanger (not shown but identical to line hanger 10) so that linear segment 154 extends between the upright members 56, 58.

Figure 12:
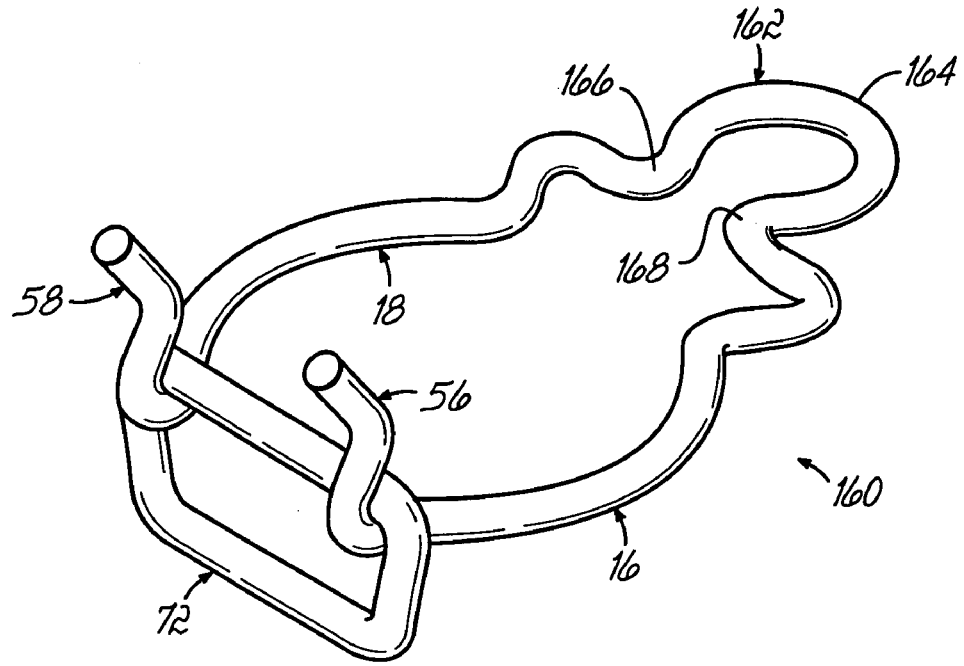
FIG. 12 is a perspective view of an alternative embodiment of a line hanger in accordance with the principles of the invention.

With reference to FIG. 12 in which like reference numerals refer to like features in FIGS. 1–3, a line hanger 160 is substantially identical to line hanger 10 other than modifications made to attachment section 14. Specifically, line hanger 160 is provided with an attachment section 162 including a round or circular loop 164 which is substituted for the loop 24 of line hanger 10. Angled bends 166, 168 are bent such that the loop 164 is substantially coplanar with clamping arms 16, 18. The loop 164 receives a fastener (not shown) for securing the line hanger 160 to a support structure (not shown).

Figure 13:
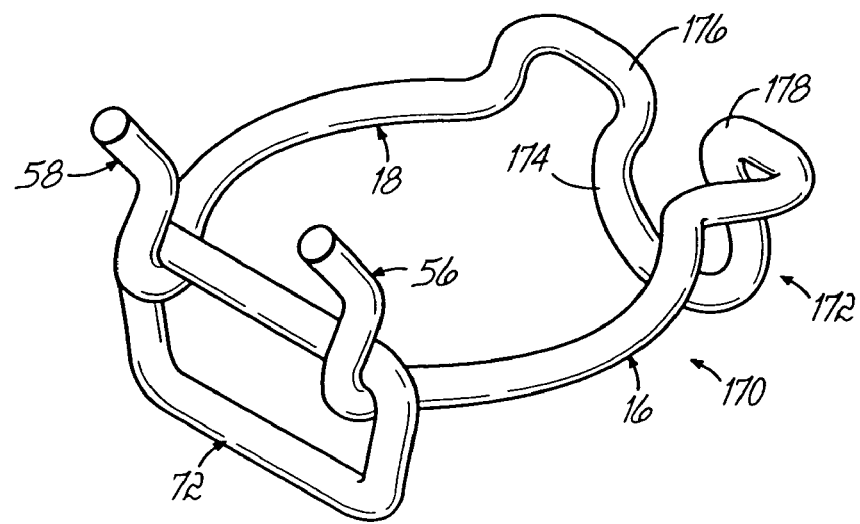
FIG. 13 is a perspective view of an alternative embodiment of a line hanger in accordance with the principles of the invention.

With reference to FIG. 13 in which like reference numerals refer to like features in FIGS. 1–3, a line hanger 170 is substantially identical to line hanger 10 other than modifications made to attachment section 14. Specifically, line hanger 170 is provided with an attachment section 172 including a round or circular loop 174 substituted for the loop 24 of line hanger 10. Angled bends 176, 178 are bent such that the loop 174 extends in an opposite direction away from a plane containing the clamping arms 16, 18 compared with the direction in which upright members 56, 58 extend away from the plane containing the clamping arms 16, 18. The loop 174 receives a fastener (not shown) for securing the line hanger 170 to a support structure (not shown). The invention contemplates that the clamping arms 16, 18 may be coplanar with loop 174, may depend outwardly from loop 174 at an acute angle, may extend outwardly from loop 174 transversely at a right angle, or may depend outwardly from loop 174 at an obtuse angle.

Figure 14:
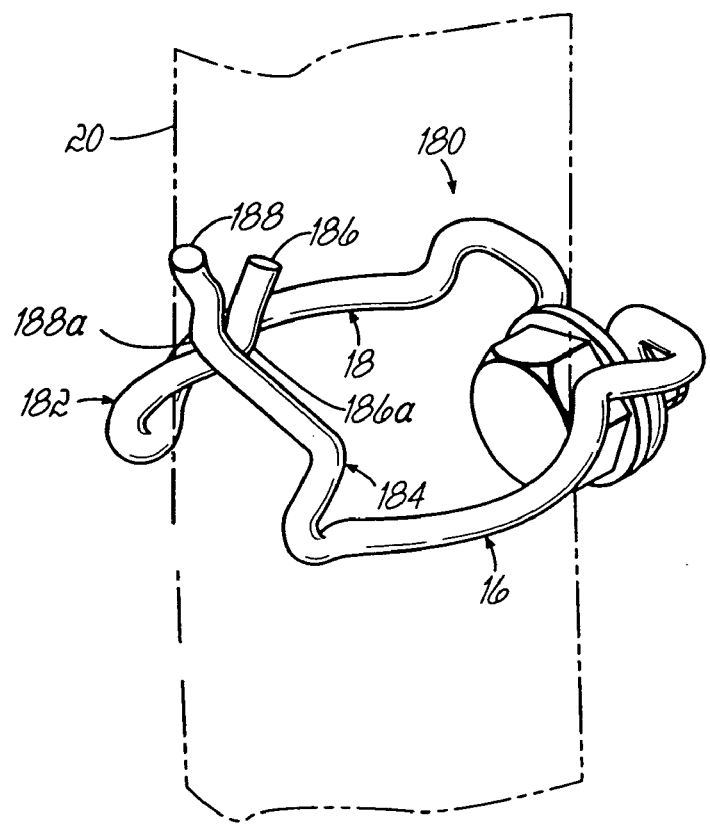
FIG. 14 is a perspective view of an alternative embodiment of a line hanger in accordance with the principles of the invention.

With reference to FIG. 14 in which like reference numerals refer to like features in FIGS. 1–3 and in an alternative embodiment, line hanger 180 may be provided with upright members 182, 184 that are capable of being interlocked to constrain the clamping arms 16, 18 against relative deflection as a substitute for terminating element 72 (FIG. 1). To that end, the upright members 182, 184 include respective twisted ends 186, 188 that may be interlocked after line 20 is inserted to constrain separation of the clamping arms 16, 18. Specifically, the upright members 182, 184 are resiliently flexible so that the twisted ends 186, 188 may be interlocked or coupled by mutual engagement of confronting concave portions of respective angled bends 186a, 188a. The twisted ends 186, 188 are inclined toward one another relative to the clamping arms 16, 18. It is appreciated that line hangers 150, 160, 170, 180 may participate in a stacked arrangement as described herein.

The invention provides a one-piece, stackable line hanger capable of securing one or more lines to a support structure in a spatially compact manner. The line hanger of the invention is inexpensive to manufacture. The line hanger of the invention is quickly and easily installed because no auxiliary hardware, such as screws, bolts, nuts and washers, is required, which reduces the number of components for securing the line and simplifies line installation. The line hanger of the invention requires little or no tools for mounting and coupling multiple hangers in a stacked fashion which effects a considerable savings in labor and speeds installation. When mounted to the support structure or to another line hanger, the line hanger resists rotation, displacement and detachment.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art. The invention itself should only be defined by the appended claims, wherein we claim:

The invention claimed is:

1. An apparatus for securing multiple lines to a support structure, comprising:
   a first mounting device formed of rod material with an open end and a closed end, the first mounting device including:
   a first support attachment provision configured into the closed end for mounting to a support structure, and a pair of closed end angled bends formed adjacent the closed end of the first mounting device;
   a spaced-apart pair of resilient first clamping arms extending outwardly from said first support attachment provision and the closed end angled bends to define the open end, said first clamping arms configured to receive and hold one of the lines therebetween; and
   an open end angled bend formed in each of the first clamping arms proximate the open end of the first mounting device;
   and
   a second mounting device formed of rod material with an open end and a closed end, the second mounting device including:
   a second support attachment provision configured into the closed end, and a pair of closed end angled bends formed adjacent the closed end;
   the closed end angled bends of the second mounting device configured for interconnecting with said open end angled bends of said first clamping arms for preventing relative separation thereof and the second mounting device having a spared-apart pair of resilient second clamping arms extending outwardly from said second support attachment provision, said second clamping arms having open ends and configured to receive and hold another of the lines therebetween, the open ends of the second clamping arms capable of being coupled together for preventing relative separation of said second clamping arms.

2. The apparatus of claim 1, further comprising:
a terminating element capable of being removably received by said pair of second clamping arms for coupling together said pair of second clamping arms to prevent relative separation when the line is secured therebetween.

3. The apparatus of claim 2, wherein said terminating element is a loop dimensioned to fit over a portion of said second clamping arms.

4. The apparatus of claim 1, wherein the open end of one of said second clamping arms is capable of being interlocked with the open end of the other of said second clamping arms in a contacting relationship for preventing relative separation of said second clamping arms.

5. A method of securing lines to a support structure, comprising:
coupling a support attachment provision of a first mounting device to an attachment point on the support structure, the first mounting device and the support attachment provision of the first mounting device formed of a rod material and having an open end and a closed end with a pair of closed end angled bends formed adjacent the closed end of the device;
positioning a first line proximate to a spaced-apart pair of clamping arms of the first mounting device which extend from the closed end angled bends to define the open end, an open end angled bend formed in each of the clamping arms proximate the open end;
moving the line so as to resiliently separate the clamping arms and receive the first line in a position between the clamping arms for applying a clamping force thereto; and
interconnecting the open end angled bends with closed end angled bends of an adjacent second mounting device of the same construction to secure the first line by coupling together the clamping arms of the first mounting device so as to prevent relative separation.

6. The method of claim 5 further comprising:
positioning a second line proximate to a spaced-apart pair of clamping arms of the second mounting device;
moving the line so as to resiliently separate the clamping arms of the second mounting device and receive the second line in a position between the clamping arms of the second mounting device for applying a clamping force thereto; and
interconnecting open end angled bends of the second mounting device with at least one of the closed end angled bends of an adjacent third mounting device or with terminating element angled bends of a terminating element to secure the second line by coupling together the clamping arms of the second mounting device so as to prevent relative separation.

7. The method of claim 6 wherein the clamping arms of the second mounting device are coupled with a terminating element.

8. The method of claim 5 wherein the step of coupling further comprises:
mounting a coupling element to the attachment point; and
mounting the support attachment provision of the first mounting device to the coupling element.

9. The method of claim 5 wherein the attachment point comprises a cylindrical conduit, and the step of coupling further comprises:
mounting a coupling element to the cylindrical conduit; and
mounting the support attachment provision of the first mounting device to the coupling element.

10. The method of claim 5 wherein the support attachment provision is directly coupled with the attachment point free of intervening structures.

11. A method of suspending a line from a cylindrical support structure, comprising:
coupling a spaced-apart pair of clamping arms of a first mounting device formed of a rod material about said cylindrical support structure;
fastening a support attachment provision of the first mounting device with a support attachment provision of a second mounting device, the support attachment provision formed as a portion of the rod material of said first mounting device;
positioning the line proximate to a spaced-apart pair of clamping arms of the second mounting device, an open end angled bend formed in each of the second mounting device clamping arms;
moving the line so as to resiliently separate the clamping arms of the second mounting device and receive the line in a position between the clamping arms for applying a clamping force thereto; and
interconnecting the open end angled bends of the clamping arms of the second mounting device with the closed end angled bends of at least one of another mounting device of the same construction and a termination element so as to prevent relative separation of the clamping arms.

12. The method of claim 11 wherein the clamping arms of the second mounting device are interconnected with a terminating element.

* * * * *